(12) United States Patent
Bojanowski et al.

(10) Patent No.: US 10,738,869 B2
(45) Date of Patent: Aug. 11, 2020

(54) PRECISELY ALIGNED, FRICTION WELDED SPIRAL BEVEL OR HYPOID RING GEAR AND DIFFERENTIAL CASE ASSEMBLY

(71) Applicant: FORD GLOBAL TECHNOLOGIES, LLC, Dearborn, MI (US)

(72) Inventors: Paul John Bojanowski, Macomb Township, MI (US); Andreas Evangelos Perakes, Canton, MI (US); Thomas Gerard Neumann, Sterling Heights, MI (US); Mark E. Briscoe, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 115 days.

(21) Appl. No.: 15/892,867

(22) Filed: Feb. 9, 2018

(65) Prior Publication Data

US 2018/0172131 A1 Jun. 21, 2018

Related U.S. Application Data

(63) Continuation-in-part of application No. 14/953,760, filed on Nov. 30, 2015, now abandoned.

(51) Int. Cl.
*F16H 48/40* (2012.01)
*B23K 20/12* (2006.01)
(Continued)

(52) U.S. Cl.
CPC .......... *F16H 48/40* (2013.01); *B23K 20/129* (2013.01); *B23K 2101/006* (2018.08);
(Continued)

(58) Field of Classification Search
None
See application file for complete search history.

(56) References Cited

U.S. PATENT DOCUMENTS 3,980,248 A 9/1976 Minoshima
5,211,100 A 5/1993 Fuller et al.
(Continued)

FOREIGN PATENT DOCUMENTS

JP 2565041 B2 12/1996
JP 2005081351 A 3/2005

OTHER PUBLICATIONS

English machine translation of JP2005081351A.
(Continued)

*Primary Examiner* — Timothy Hannon
(74) *Attorney, Agent, or Firm* — Vincent Mastrogiacomo; King & Schickli, PLLC

(57) ABSTRACT

A method for manufacturing a case-hardened ring gear/differential case assembly includes attaching a ring gear to a differential case. The case-hardened ring gear and the differential case are fabricated of materials each having differing properties of at least carbon content and melting temperature. The attaching includes placing a flange of the case-hardened ring gear in intimate contact with a flange of the differential case whereby a predetermined gap is defined between a remainder of the ring gear and a remainder of the differential case. The ring gear flange is attached to the differential case flange by a friction welding process. The predetermined gap defines an outflow channel that receives a carburized portion of the case-hardened ring gear as overflow material created by an upset forging step of the friction welding process. Differential assemblies and vehicles including such are described.

15 Claims, 5 Drawing Sheets

(51) Int. Cl.
  *F16H 48/08*   (2006.01)
  *F16H 48/38*   (2012.01)
  *B23K 101/00*  (2006.01)

(52) U.S. Cl.
  CPC ........ *F16H 48/08* (2013.01); *F16H 2048/382* (2013.01); *F16H 2048/385* (2013.01)

(56) References Cited

U.S. PATENT DOCUMENTS

| | | |
|---|---|---|
| 5,533,423 A | 7/1996 | Stehle et al. |
| 6,767,071 B2 | 7/2004 | Cai |
| 7,008,345 B2 | 3/2006 | Phelan et al. |
| 8,015,899 B2 | 9/2011 | Gianone et al. |
| 8,747,275 B2 | 6/2014 | Shioiri et al. |
| 2008/0138649 A1 | 6/2008 | Mataga et al. |
| 2012/0149522 A1 | 6/2012 | Isken, II et al. |
| 2012/0295125 A1 | 11/2012 | Uchida et al. |
| 2016/0355054 A1* | 12/2016 | Jensen .................... B60B 35/16 |

OTHER PUBLICATIONS

English machine translation of JP2565041B2.
Non-Final Office Action dated May 19, 2017 for Utility U.S. Appl. No. 14/953,760, filed Nov. 30, 2015.
Final Office Action dated Sep. 18, 2017 for Utility U.S. Appl. No. 14/953,760, filed Nov. 30, 2015.

\* cited by examiner

PRECISELY ALIGNED, FRICTION WELDED SPIRAL BEVEL OR HYPOID RING GEAR AND DIFFERENTIAL CASE ASSEMBLY

TECHNICAL FIELD

This disclosure relates generally to vehicle drive train assemblies. In particular, the disclosure relates to methods for attaching a spiral or hypoid bevel ring gear to a differential case, and to ring gear/differential case assemblies provided according to the method.

BACKGROUND

As background and with reference to FIGS. 1A and 1B, a representative differential carrier 100 is shown, being the part of a vehicle powertrain responsible for transmitting drive power from the vehicle engine to the vehicle drive wheels. The depicted embodiment of a differential carrier 100 is for a rear axle differential. However, this should not be taken as limiting, as the skilled artisan is well aware of variations in differential type and design.

The differential carrier 100 includes a gear assembly (indicated generically by reference numeral 102) driven by an input drive shaft 104. Gear assembly 102 is operatively connected to a pair of output drive shafts 106, 106', whereby torque and rotation are transmitted from a vehicle engine 108 to the vehicle wheels 112 (see FIG. 1B). Of course, additional elements are typically included for transmitting drive power (FIG. 1B, see arrows) from the engine 108 to the wheels 112, such as a torque converter 114, a transmission 116, etc.

Returning to FIG. 1A, a hypoid ring gear and differential assembly 118 is operatively connected to the input drive shaft 104. The hypoid ring gear and differential assembly 118 includes a hypoid ring gear 122 which meshes with a hypoid pinion gear 119 of the differential assembly. As is known, a spiral or hypoid gear is so named for its helically-shaped spiral bevel gear teeth, which produce less vibration and noise than conventional straight-cut or spur-cut gears with straight teeth. As shown, an axis of the hypoid ring gear and differential assembly 118/input drive shaft 104 is substantially perpendicular to an axis of the differential carrier 100/output drive shafts 106, 106'. The ring gear 122 is attached to a portion of a differential case 120, which as is known is a housing for the differential carrier 100, in a configuration providing a required meshing between the ring gear 122 and the hypoid pinion gear 119. Gear assembly 102 may also include a side gear 126. As the input drive shaft 104 rotates, so does the hypoid pinion gear 119, driving rotation of the ring gear 122. By this rotation, torque and rotation are transmitted via output drive shafts 106, 106' to wheels 112.

Alignment of these components during assembly of an axle or rear drive module is important, since as explained the ring gear 122 must mesh with the hypoid pinion gear 119 in a completed axle or rear drive module assembly to transmit the needed torque/rotation to the vehicle wheels 112. Typically these elements are fabricated of different and potentially weld-incompatible materials. For example, a ring gear 122 is often fabricated of steel or an alloy which may or may not be carburized, and if carburized (case-hardened) may have a carbon content of >0.8%. A differential case 120 is often fabricated of high-carbon materials such as nodular ductile iron, and may have a carbon content of 2% or more. Welding such dissimilar materials is challenging at least due to the different material melting temperatures, as well as the resultant high carbon content of the weld interface which may result in weld cracking. For this reason, the most common method for attaching the two is to provide a bolt-on connection using conventional fasteners. While effective, such conventional attachment means increase the required labor and attendant cost, and also contribute to undesirable increases in weight and packaging size.

For this reason, despite the above-mentioned challenges various welding techniques have been considered as an alternative to conventional fasteners to attach the ring gear to the differential case. Laser welding has been attempted to provide a strong attachment despite the incompatibility of the materials of which the hypoid ring gear and differential case are fabricated. In laser welding, typically a nickel feed wire is used to provide a strong and consistent weld in spite of the above-mentioned incompatibility in materials and high-carbon weld surfaces which can crack. Disadvantageously, the high weld temperatures and rapid cooling rates associated with laser welding can cause a drive ring gear to become distorted or warped, preventing the required precise alignment between the ring gear and the mating pinion gear. Moreover, conventional laser welding techniques produce weld spatter that may bond onto the teeth of the ring gear and other components of the vehicle differential assembly, potentially resulting in wear and reduced lifespan and/or failure of the componentry. Likewise this condition may manifest itself as an undesirable Noise/Vibration/Harshness result in the final axle/vehicle assembly. To avoid such weld spatter resulting from laser welding, it is necessary to provide shielding and to implement post-welding maintenance and cleaning protocols. Moreover, laser welding is highly energy-inefficient compared to other welding techniques and requires specialized safety and maintenance protocols due to the use of laser technology. Still more, components to be laser welded must be extremely clean, most commonly laser-cleaned. Each of these factors undesirably adds to labor requirements and attendant costs of manufacturing/assembling a hypoid ring gear/differential case assembly.

Thus, a need is identified in the art for improvements to processes for joining ring gears to differential cases during vehicle drivetrain/powertrain manufacture and assembly. Such improvements should take into account joining materials having significantly different carbon contents, and should provide a weld interface that is low in carbon content despite such dissimilarities in the carbon content of the materials being joined.

SUMMARY

In accordance with the purposes and benefits described herein and to solve the above-summarized and other problems, in one aspect a method of making a ring gear/differential case assembly is described, comprising providing and aligning a differential case having a differential case flange and a case-hardened ring gear having a ring gear flange. The case-hardened ring gear is made of a first material and the differential case is made of a second material that is different from the first material. In embodiments, the ring gear material has a portion having a carbon content of at least 0.8% and the differential case material has a carbon content of at least 2%.

The ring gear flange and differential case flange are dimensioned and held adjacent to one another to, when attached, provide a required alignment and meshing of the ring gear with a cooperating hypoid pinion gear. A predetermined tolerance or fit is provided between an inner diameter of the ring gear and an outer diameter of the differential case flange, such as by configuring the machinery used to hold the two components adjacent one to the other for attaching, whereby a gap of predetermined dimensions is provided between at least a portion of the two. In embodiments, this is accomplished by holding the differential case coaxially at each hub thereof. In turn, the ring gear is held by a suitable holder, for achieving the proper alignment and predetermined tolerance.

Next, a friction welding process is used to attach the ring gear flange to the differential case flange. By the dimensioning and configuration of the case-hardened ring gear flange/differential case flange and the predetermined gap, post-weld overflow material or flash created during a friction welding upset forging step is directed into the predetermined gap. Thus, the predetermined gap defines an overflow channel between the ring gear and the differential case. In particular, a carburized (carbon content at least 0.8%) layer of the case-hardened ring gear is displaced during the friction welding process and is directed into the predetermined gap as overflow. In this manner, contamination of differential components by such overflow material is avoided. Further, a lower-carbon weld interface between the case-hardened ring gear and the differential case flange that is less susceptible to cracking is provided. Still more, post-welding cleanup is substantially avoided, without impact on component form, fit, or function. In embodiments, a predetermined gap of from 0.03 cm to 0.25 cm is provided.

In other aspects of the disclosure, ring gear/differential case assemblies are provided, made according to the disclosed methods.

In the following description, there are shown and described embodiments of the disclosed ring gear/differential case assembly and method of making. As it should be realized, the described assembly and method are capable of other, different embodiments and their several details are capable of modification in various, obvious aspects all without departing from the devices and methods as set forth and described in the following claims. Accordingly, the drawings and descriptions should be regarded as illustrative in nature and not as restrictive.

BRIEF DESCRIPTION OF THE DRAWINGS

The accompanying drawing figures incorporated herein and forming a part of the specification, illustrate several aspects of the disclosed ring gear/differential case assembly and method of making, and together with the description serve to explain certain principles thereof. In the drawings.

Reference will now be made in detail to embodiments of the disclosed ring gear/differential case assembly and method of making, examples of which are illustrated in the accompanying drawing figures wherein like reference numerals indicate like features.

DETAILED DESCRIPTION

Figure 1A:
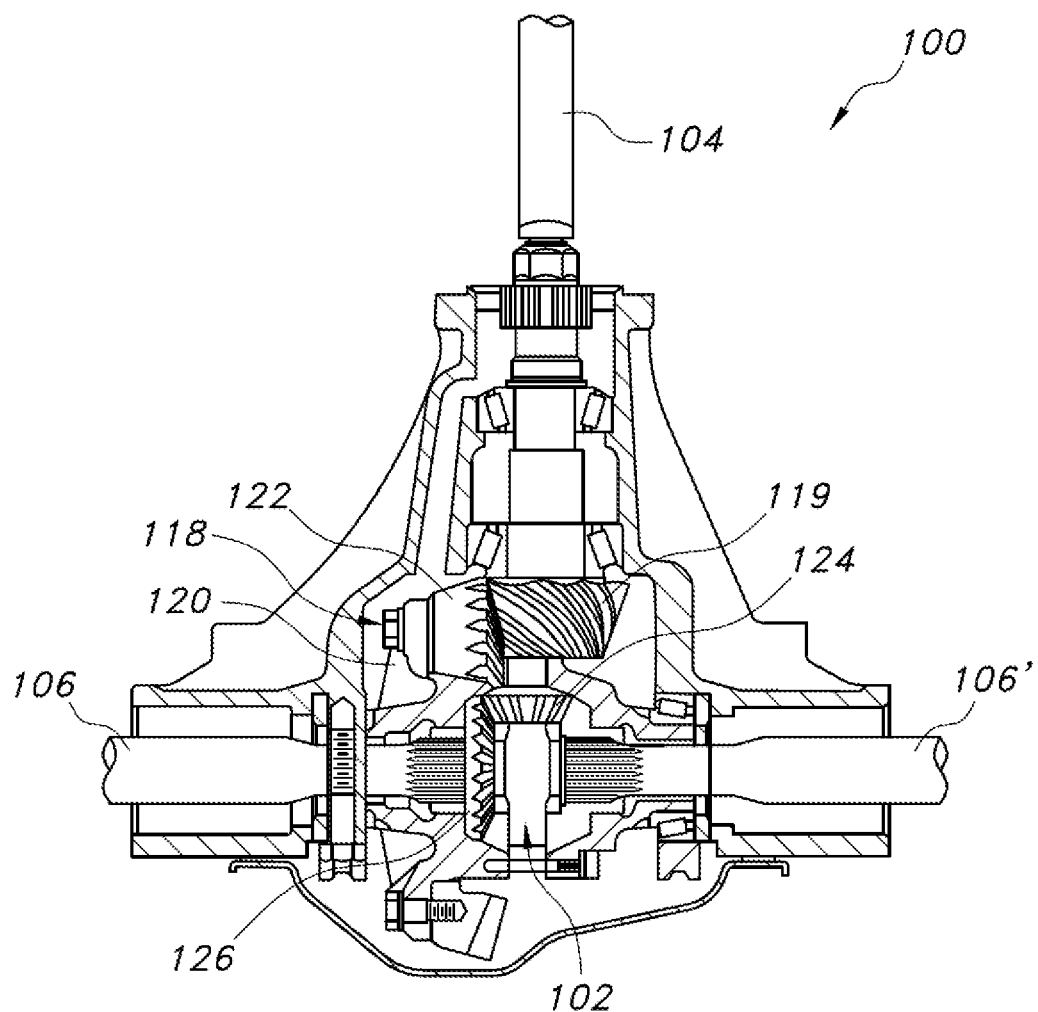
FIG. 1A depicts an isolated view of a prior art axle carrier assembly.
Figure 1B:
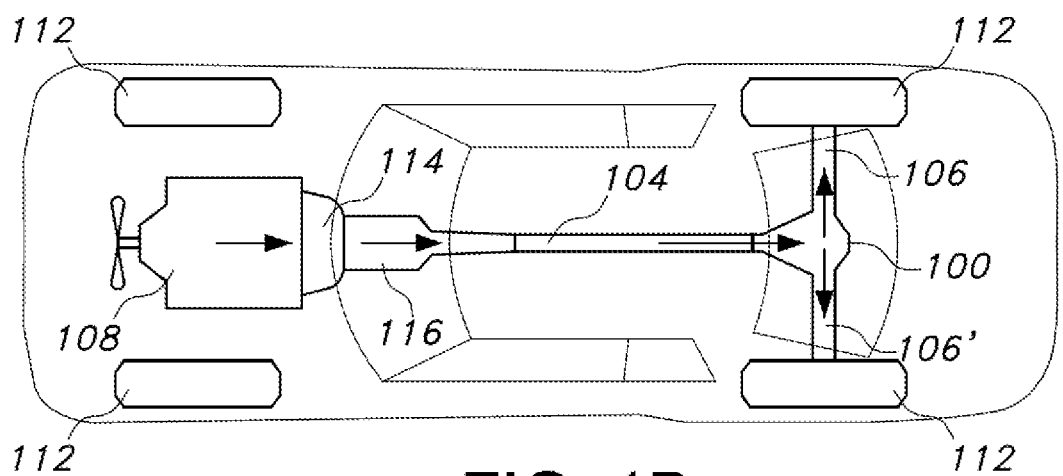
FIG. 1B depicts a prior art vehicle and vehicle drivetrain.

As summarized above, the dissimilar materials of which the two components are fabricated (for example, steel or an alloy for the ring gear 122 and nodular ductile iron for the differential case 120), and in particular the dissimilar carbon contents of those materials, present engineering challenges in connecting/joining the two. In turn, the problem of precise alignment of components to provide a suitable meshing of the ring gear 122 and the hypoid pinion gear 119 must be addressed.

Friction welding is a solid-state welding process whereby heat is generated through a mechanical friction imposed upon workpieces placed in contact with one another. During the process, additional lateral forces ("upset" forces) are imposed to plastically displace and fuse the materials of the workpieces. At a high level, the molecules of the dissimilar materials are placed under sufficient frictional heat and pressure to form bonds. Because no material melt occurs, friction welding is not a welding process in the traditional sense but is actually a forging technique. The fast joining times and direct heat input at the weld interface provided by friction welding result in relatively small heat-affected zones. Moreover, friction welding techniques are substantially melt-free, avoiding grain growth in engineered materials. Still more, the relative motion generated between surfaces during friction welding provides a cleaning effect on the surfaces of the materials being joined. Thus, less preparation of workpiece surfaces is required before and less cleaning of workpiece surfaces is required after the friction welding process.

Friction welding is advantageous also in that strong bonds between very dissimilar materials can be achieved without need of additional fasteners. The difference in melting temperatures of dissimilar materials such as steel/alloys and nodular ductile iron precludes the use of conventional welding techniques. However, as explained above friction welding does not require material melt, but instead provides frictionally-induced plastic displacement and fusion of the molecules of dissimilar materials. This provides a full strength bond between dissimilar materials with no additional weight and, as noted above, requires no post-welding cleanup. A number of variants of friction welding are known in the art, including spin welding, linear friction welding, friction surfacing, linear vibration welding, angular friction welding, and orbital friction welding. Each method shares the same advantage, i.e. not requiring melting of either material, but instead employing frictional heat to create a plastic zone between two dissimilar materials whereby exertion of an external force (upset) forges the materials into a single, homogenous material interface.

Yet another advantage of friction welding is that dissimilar materials can be precisely aligned for joining, since by controlling the amount of material upset it is possible to provide very narrow tolerances in automated processes. In turn, because friction welding processes require lower temperatures than conventional welding techniques, components may be joined during later stages of a fabrication or machining process, for example at final assembly, without need of post-welding clean-up or other processes. Even more, the risk of component warping/distortion is reduced, also due to the lower temperatures associated with friction welding.

An engineering challenge to be overcome in implementing friction welding to join a ring gear 122 having a relatively low carbon content to a differential case 120 having a relatively high carbon content was the creation of overflow material or "flash," i.e. small particles of workpiece material that are forced out of the working mass during the friction welding/upset process. These small particles could potentially deposit within other elements of the differential carrier 100, causing damage to the gear assembly 102 and other components therein and reducing component useful lifespan. While this could be addressed by a post-friction welding cleaning step, it was desired to avoid the additional labor and attendant costs. Likewise, another challenge to be overcome was ensuring a low carbon content of the weld interface, without requiring labor-intensive procedures.

Figure 2:
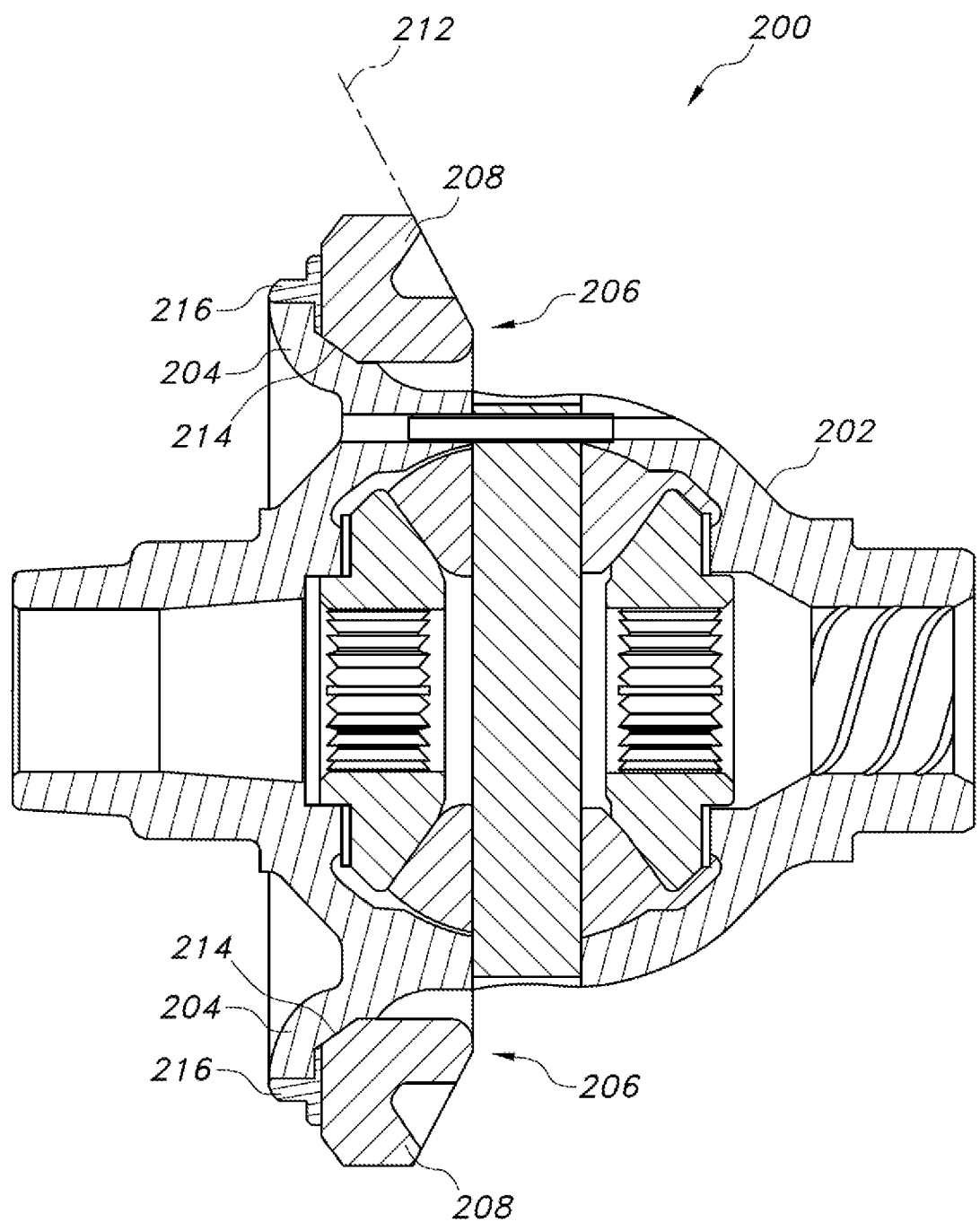
FIG. 2 shows a cross-sectional side view of a ring gear/differential case assembly according to the present disclosure, illustrating a back-face weld.

To solve this and other problems, with reference to FIG. 2 there is shown in isolation a ring gear/differential case assembly 200 according to the present disclosure. As shown, the assembly 200 includes a differential case 202 which as described above is often fabricated of a first material such as nodular ductile iron. The differential case 202 includes or defines a flange 204 having an outer diameter.

FIG. 2 also shows a case-hardened ring gear 206 having a ring gear flange 208 defining an inner diameter. As summarized above, case-hardened ring gears 206 are typically fabricated of a second material such as steel or an alloy having different physical properties than the first material, such as hardness, melting temperature, carbon content, and in particular have a carburized outer layer having a carbon content that is typically 0.8% or more as noted above. As shown in the drawing figures, the ring gear flange 208 must be connected to a differential case flange 204, whereby after assembly the needed alignment and meshing of the ring gear 206 with a cooperating hypoid pinion gear (not visible in this view) is provided.

To accomplish this, the ring gear flange 208 and differential case flange 204 are held for the friction welding process whereby intimate contact is provided along a portion of the ring gear flange 208 and the differential case flange 204, but also whereby a predetermined gap 214 is defined between a portion of the inner diameter of the ring gear flange 208 and an outer diameter of the differential case flange 204. This is accomplished in an embodiment by configuring the automated machinery used to hold the two components adjacent one to the other for the attaching to provide the desired gear meshing/alignment, the intimate contact between a portion of the ring gear flange 208 and differential case flange 204, and the predetermined gap 214.

In embodiments, this is accomplished by holding the differential case 202 coaxially at each hub thereof. In turn, a holder is provided to which the ring gear 206 is secured, for achieving the proper alignment and predetermined gap 214. In an embodiment, the predetermined gap 214 is at least 0.03 cm, although it will be appreciated that alternative gaps/tolerances may be required in accordance with differing differential assembly configurations and/or dimensions.

Next, a friction welding process is used to attach the ring gear shoulder 208 to the differential case pilot 204. As summarized above and as is known to the skilled artisan, friction welding results from heat generated through mechanical friction imposed by a friction welder (see FIG. 4) on the contacting surfaces of the ring gear flange 208 and the differential case flange 204. During the process, additional lateral forces (often referred to as an upset forging step) are imposed by the friction welder to plastically displace and fuse the different materials of the ring gear flange 208 and the differential case flange 204, thus forming a weld or fusion 216 between the two. A friction welding tool controller configured to set a pitch line 212 of the ring gear 206 to a desired angle relative to the orientation of the differential case 202.

Figure 3:
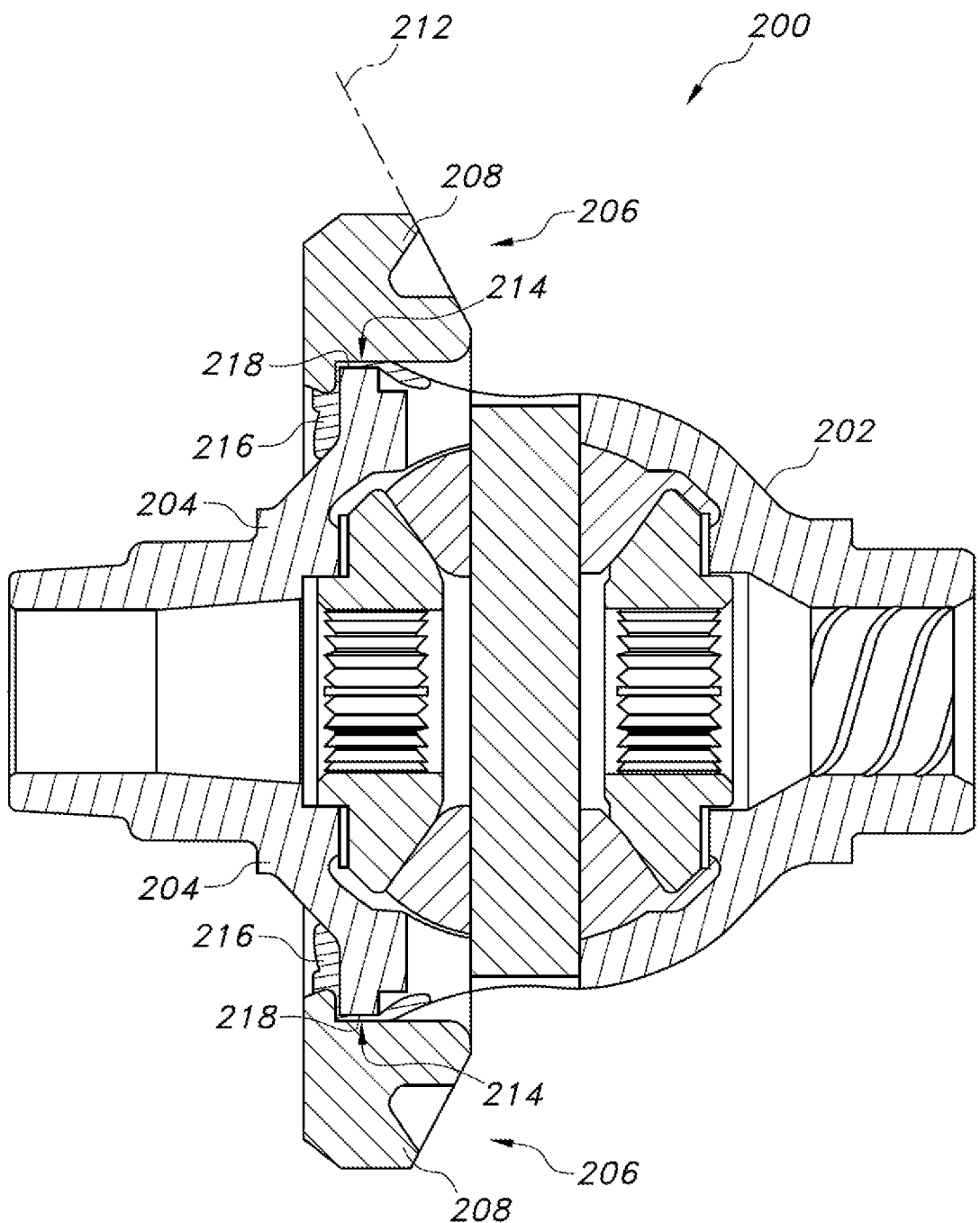
FIG. 3 shows a cross-sectional side view of the ring gear/differential case assembly of FIG. 2, illustrating an inside weld.

With reference to FIG. 3, as shown therein the providing of a predetermined gap 214 also creates an overflow channel between the ring gear flange 208 and the differential case flange 204 for receiving overflow material 218 or flash created during a friction welding upset process. As shown therein, the overflow material 218 disperses into the gap 214, without contacting any of the various described elements of the differential assembly. In this manner, contamination of any differential components by overflow material, post-welding cleanup, etc. are substantially avoided, without impact on component form, fit, or function. Surprisingly, the present inventors have also found that the overflow material 218 or flash created during friction welding contains the more carburized portion of the material generated during the friction weld process. Thus, advantageously by the above-described structures and processes the more carburized portion of the friction welding process is dispersed into the gap 214, leaving a lower carbon content weld interface that is stronger and less prone to cracking than a similar weld interface made without the described structures/processes. In embodiments, the present inventors have found that a weld interface having a carbon content of 1.2% or less can be provided by the above structures/processes.

Figure 5A:
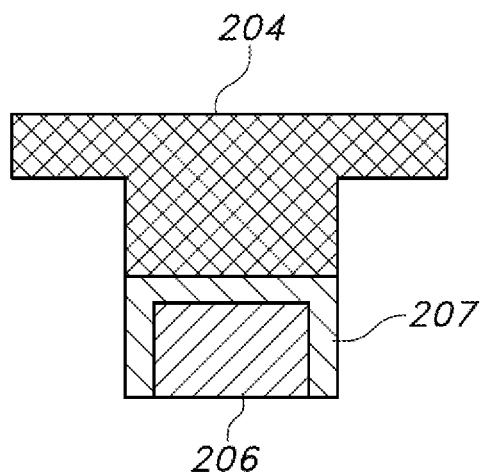
FIG. 5A illustrates a cross-sectional view of a conventional case-hardened ring gear and differential case prior to a friction welding process.
Figure 5B:
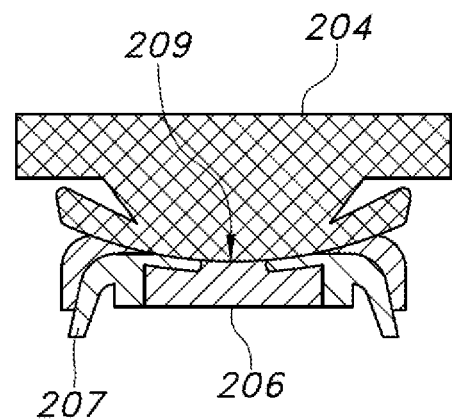
FIG. 5B illustrates a cross-sectional view of the weld interface created between the case-hardened ring gear and differential case of FIG. 5A after the friction welding process.

In more detail, FIGS. 5A-5B illustrate in cross-sectional view a friction welding process for a differential case 204 and case-hardened ring gear 206 lacking the described ring gear flange 208 and differential case flange 204. As described above, the case-hardened ring gear 206 includes a carburized layer 207 having a carbon content of at least 0.8%. In the illustrated embodiment of FIGS. 5A and 5B, the differential case 204 and case-hardened ring gear 206 are simply abutted (FIG. 5A) prior to the friction welding process. After friction welding is completed (FIG. 5B), as illustrated the weld interface 209 includes a portion of the carburized layer 207. This weld interface, by the carbon content provided by the carburized layer 207, has an increased risk of cracking.

Figure 6A:
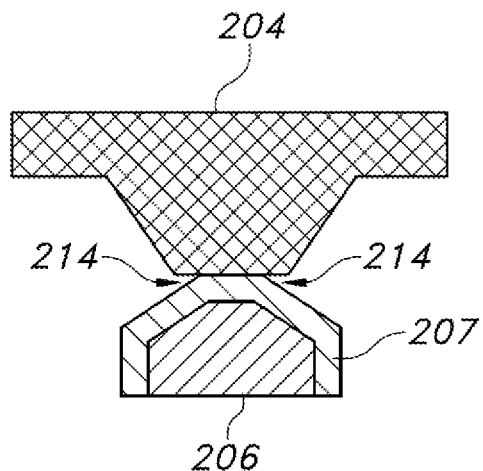
FIG. 6A illustrates a cross-sectional view of a case-hardened ring gear and differential case according to the present disclosure prior to a friction welding process.
Figure 6B:
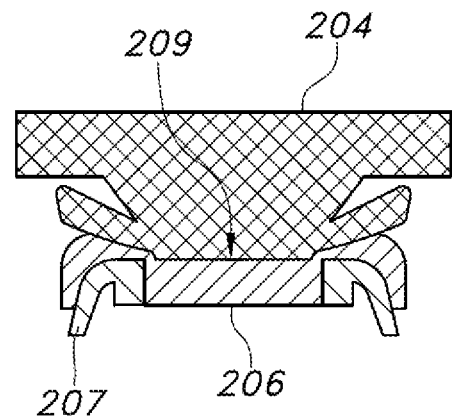
FIG. 6B illustrates a cross-sectional view of the weld interface created between the case-hardened ring gear and differential case of FIG. 6A after the friction welding process.

Conversely, FIGS. 6A-6B illustrate in cross-sectional view a friction welding process for a differential case 204 and case-hardened ring gear 206 including the above-described ring gear flange 208 and differential case flange 204. In the illustrated embodiment of FIGS. 6A and 6B, the differential case 204 and case-hardened ring gear 206 flanges 204/208 are aligned and abutted (FIG. 6A), defining the predetermined gap 214 prior to the friction welding process. After friction welding is completed (FIG. 6B), as illustrated the carburized layer 207 of the case-hardened ring gear 206 is directed to overflow by way of the predetermined gap 214. In addition to the above advantages of the described structure, the weld interface 209 created, because of the decreased carbon content provided by directing the carburized layer 207 to overflow, provides a stronger weld bond with a decreased risk of cracking.

Figure 4:
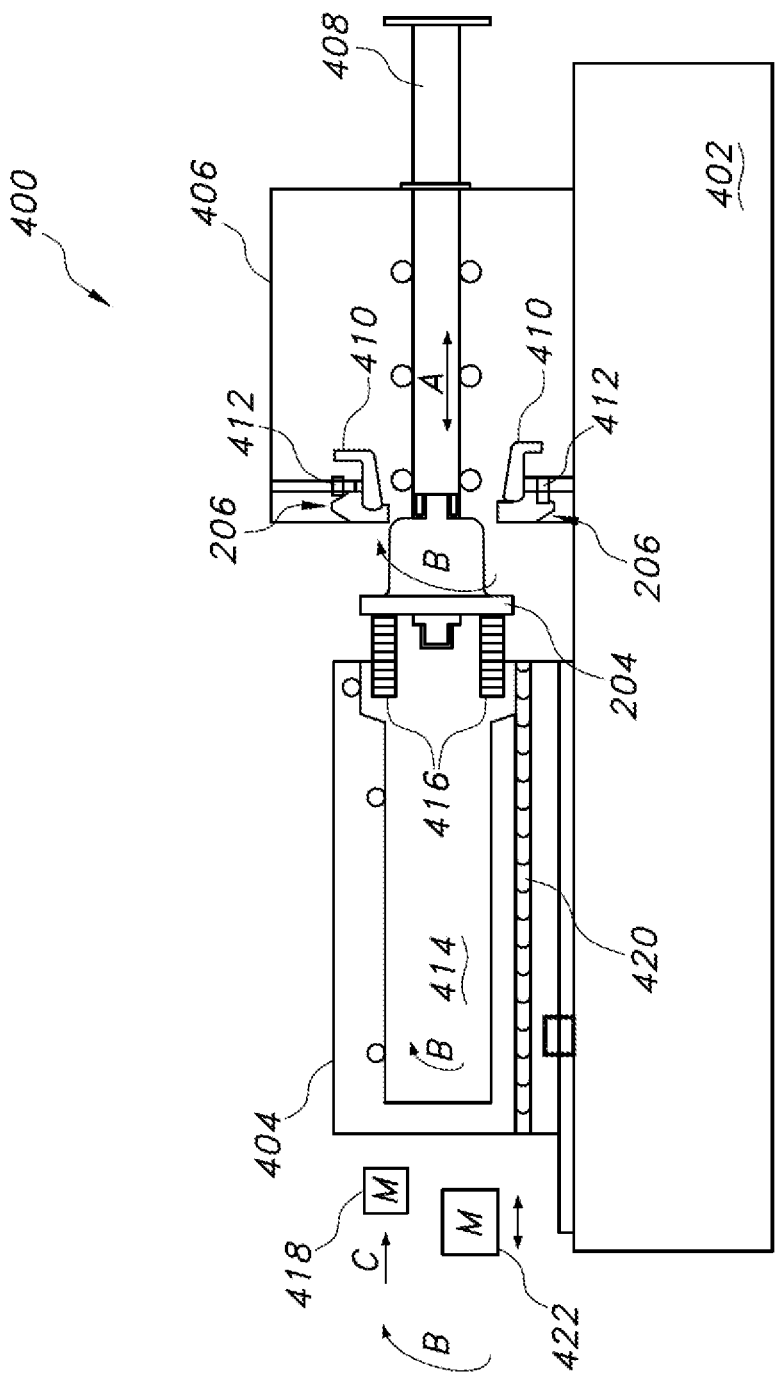
FIG. 4 depicts a representative friction welding device for making the ring/gear differential case assembly of FIG. 2.

The basic elements of a friction welding machine are known in the art, and do not require extensive discussion herein. However, FIG. 4 illustrates a representative friction welding machine 400 applicable to fabricate a ring gear 206/differential case 204 assembly as described above. A base 402 supports the machine 400. The machine includes a rotating portion 404 and a fixed portion 406. The fixed portion 406 includes a biasing element 408 such as a pneumatic or hydraulic cylinder which urges (see arrow A) ring gears 206 held by suitable holders 410 towards a differential case 204 held by the rotating portion 404. Any suitable holder 410 is contemplated, including without intending any limitation clamping jaws having anti-rotate pins 412 as depicted in the drawing figure, a tooth nest plate, and others. In particular embodiments, a holder 410 comprising a nest plate or pin plate having anti-rotate pins 412 is provided, which allows precise location of the ring gear 206/differential case 204 prior to friction welding.

The rotating portion 404 as depicted includes a computer numerical control (CNC)-actuated main spindle 414 under the control of a servo motor. The main spindle 414 is configured to rotate the differential case 204 held by a clamp 416 (see arrows B) by the action of a servo motor 418. A ball screw 420 actuated by a CNC-controlled servo motor 422 urges the clamped differential case 204 (see arrow C) against the ring gears 206 held by the fixed portion 406 as described above. By the combined rotation of the differential case 204 and the upset forging forces imposed by ball screw 420/biasing element 408, the ring gear 206 and differential case 204 are precisely aligned prior to the friction welding process as described above. By these structures, a load is applied directly along an axial centerline of the desired weld interface 209.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A method for manufacturing a case-hardened ring gear/differential case assembly, comprising:
    attaching a case-hardened ring gear to a differential case whereby the case-hardened ring gear will align and operatively interface with a hypoid pinion gear of the differential assembly, the attaching including placing a ring gear flange in intimate contact with a differential case flange wherein the ring gear flange and differential case flange are configured and dimensioned whereby a predetermined gap is defined between a remainder of the ring gear and a remainder of the differential case; and
    attaching the ring gear flange to the differential case flange by a friction welding process whereby a carburized portion of the case-hardened ring gear passes into the predetermined gap as overflow during the friction welding process wherein the case-hardened ring gear is fabricated of a first material having a carbon content of at least 0.8% and the differential case is fabricated from a second material having a carbon content of at least 2%.

2. The method of claim 1, wherein the predetermined gap defines an outflow channel for receiving the carburized portion created by an upset forging step of the friction welding process.

3. The method of claim 2, wherein the predetermined gap is at least 0.03 cm.

4. The method of claim 1, wherein the aligning comprises orienting a center line axis of the ring gear in a substantially perpendicular relationship to a center line axis of the hypoid pinion gear prior to the friction welding process.

5. The method of claim 1, wherein the first material and the second material differ at least in a melting temperature property.

6. The method of claim 5, wherein the first material is steel or a steel alloy and the second material is a nodular ductile iron.

7. The case-hardened ring gear/differential case assembly manufactured by the method of claim 1.

8. A vehicle including the case-hardened ring gear/differential case assembly manufactured by the method of claim 1.

9. A case-hardened ring gear/differential case assembly, comprising:
    a differential case fabricated from a steel or a steel alloy having a carburized layer having a carbon content of at least 0.8%; and
    a case-hardened ring gear, fabricated from a nodular ductile iron having a carbon content of at least 2%, attached to the differential case whereby the case-hardened ring gear will align and operatively interface with a hypoid pinion gear of the differential assembly;
    the case-hardened ring gear including a ring gear flange and the differential case including a differential case flange each configured and dimensioned to abut one another to define a predetermined gap between a remainder of the case-hardened ring gear and a remainder of the differential case;
    the predetermined gap being positioned to receive a carburized portion of the case-hardened ring gear as overflow material created during a friction welding process.

10. The assembly of claim 9, wherein the predetermined gap defines an outflow channel for receiving the carburized portion created by an upset forging step of the friction welding process.

11. The assembly of claim 10, wherein the predetermined gap is at least 0.03 CM.

12. The assembly of claim 9, wherein a center line axis of the case-hardened ring gear is oriented in a substantially perpendicular relationship to a center line axis of the hypoid pinion gear prior to the friction welding process.

13. A vehicle including the assembly according to claim 9.

14. A method for manufacturing a ring gear/differential case assembly comprising at least a case-hardened ring gear, a hypoid pinion gear, and a differential case, the method comprising:
    positioning a ring gear flange, fabricated from a steel or a steel alloy having a carburized layer having a carbon content of at least 0.8%, adjacent to a differential case flange, fabricated from a nodular ductile iron having a carbon content of at least 2%, to align and operatively interface the ring gear with the hypoid pinion gear in the assembled differential assembly, the ring gear flange and differential case flange being configured and dimensioned to, when aligned and abutted, define a predetermined gap providing an outflow channel; and friction welding the ring gear flange directly to the differential case flange;

wherein the outflow channel is dimensioned to receive and remove overflow created by an upset forging step of the friction welding, the overflow comprising a carburized portion of the case-hardened ring gear.

15. The method of claim 14, wherein the outflow channel is at least 0.03 cm wide.

\* \* \* \* \*

UNITED STATES PATENT AND TRADEMARK OFFICE
CERTIFICATE OF CORRECTION

PATENT NO. : 10,738,869 B2
APPLICATION NO. : 15/892867
DATED : August 11, 2020
INVENTOR(S) : Paul John Bojanowski et al.

Page 1 of 1

It is certified that error appears in the above-identified patent and that said Letters Patent is hereby corrected as shown below:

In the Claims

Column 8, Line 14, please replace "The method of claim 5" with -- The method of claim 1 --, and Column 8, Line 47, please replace "gap is a least 0.03 CM" with -- gap is a least 0.03 cm --.

Signed and Sealed this
Twentieth Day of October, 2020

Andrei Iancu
*Director of the United States Patent and Trademark Office*